(No Model.)
R. BELFIELD.
ELECTRIC CIGAR LIGHTER.
No. 383,611.    Patented May 29, 1888.
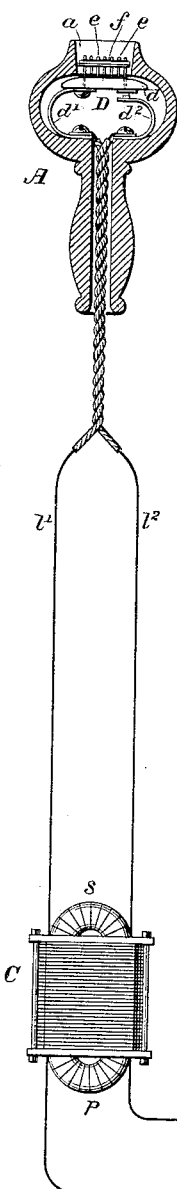
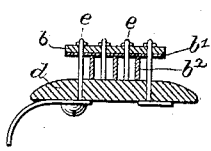
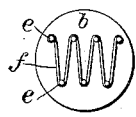
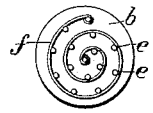
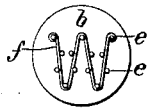
Witnesses,
Geo. W. Breck.
Carrie E. Ashley
Inventor,
Reginald Belfield
By his Attorneys
Pope Edgecomb & Ferry.

UNITED STATES PATENT OFFICE.

REGINALD BELFIELD, OF PITTSBURG, PENNSYLVANIA, ASSIGNOR TO THE WESTINGHOUSE ELECTRIC COMPANY, OF SAME PLACE.

ELECTRIC CIGAR-LIGHTER.

SPECIFICATION forming part of Letters Patent No. 383,611, dated May 29, 1888.

Application filed October 29, 1887. Serial No. 253,696. (No model.)

*To all whom it may concern:*

Be it known that I, REGINALD BELFIELD, a subject of the Queen of Great Britain, residing in Pittsburg, in the county of Allegheny, in the State of Pennsylvania, have invented certain new and useful Improvements in Electric Cigar-Lighters, of which the following is a specification.

The invention relates to a class of devices for producing heat by means of electric currents for lighting cigars and cigarettes.

The object of the invention is to provide a convenient device of this character which may be employed in connection with a system of electric distribution employing alternating electric currents.

The invention consists in placing within a suitable holder a strip of wire of platinum or other suitable metal, arranged in any suitable manner so that its surface may be exposed to the end of the cigar, and in providing it with means for connecting it in an electric circuit when the cigar is in position to be lighted. The wire is preferably carried upon pins extending through a support of asbestus, which in turn may be lined beneath with mica, if desired. The pins are carried upon a suitable base of refractory material, such as fire-clay. This base is supported upon a yielding arm, through which the electric connections are made with one terminal of the platinum wire. The other terminal of the wire is connected with an insulated circuit-closing point upon the base, and this may be pressed by the cigar against an insulated contact-point. The yielding arm and the insulated contact-point are respectively connected with the poles of a suitable source of alternating, intermittent, or pulsatory electric currents.

In the accompanying drawings, Figure 1 is a vertical section of the device, showing in diagram the circuit-connections. Fig. 2 is an enlarged detail of a portion of the lighter. Fig. 3 is a plan of the incandescing wire, and Figs. 4 and 5 illustrate modifications.

Referring to the figures, A represents a suitable hollow handle constituting the holder and case for the lighter. Within this a base, D, which may be of fire-clay or other suitable refractory material, is supported upon one end of a flexible arm or spring, $d'$, the other end of which is secured to the case A. A second flexible arm, $d^2$, is in like manner secured within the case A at one end, and the other end projects beneath a contact-point, $d$, carried upon the base D.

The base D carries several pins, $e$. About these pins there is disposed a platinum or other suitable wire, $f$, which will become incandescent under the influence of electric currents of sufficient strength. The wire may be arranged as shown in Fig. 3—that is, woven about the pins; or it may be coiled about them, as indicated in Fig. 4, in a convolute, in the form of letters, as in Fig. 5, or otherwise disposed. The pin $e$, which is joined to one end of the wire $f$, is connected with the spring $d'$, and the pin connected with the other end of the wire $f$ is connected with the contact-point $d$. There is preferably beneath the wire $f$ a bed, $b$, of asbestus. This serves as a support for the pins, and also for the wire $f$. Beneath this bed there may be, if desired, a sheet, $b'$, of mica. This in turn may be supported by plates $b^2$, placed between the mica and the base D. There is preferably an air-space between the mica plate $b'$ and the base D, as shown. The pins $e$ not only serve to keep the wire in place, but they also protect the wire, as their points project slightly beyond it. They may be sharpened, so as to enter the end of the cigar, thus preventing it from being turned about and so rubbing the wire. When the cigar is pressed into the opening $a$, the base D will be pressed downward, carrying the circuit-closing point $d$ against the spring $d^2$. The two springs $d'$ and $d^2$ are respectively connected by insulated conductors $l'$ and $l^2$, extending through the hollow handle of the holder A, with the terminals of the secondary coil S of a converter or induction-coil, C. The primary coil P of this converter is designed to be included in the circuit $L'$ $L^2$ of an electric-light system, as indicated, or in any other electric circuit supplied with alternating, intermittent, or pulsatory electric currents.

The operation of the device is as follows: A cigar being pressed into the opening $a$, the circuit is closed at the point $d$. The secondary circuit of the converter being thus completed, currents are caused to traverse the wire $f$. These serve to heat the wire to incandescence or sufficiently to immediately light the end of the cigar. When the cigar is withdrawn, the circuit is broken. This prevents any waste of current. The converter is so proportioned as to reduce the current to whatever electro-motive force may be required to feed the lighter, thus obviating the necessity of introducing a resistance into the circuit.

I claim as my invention—

1. An electric cigar-lighter consisting of an electric converter, an incandescing electric conductor, a moving support for the same, a contact upon the support constituting one terminal of the secondary circuit of the converter, and a contact-point constituting the other terminal, against which the first contact is placed by pressure against the support.

2. An electric cigar-lighter consisting of an incandescing conductor and a circuit-closer for closing the connections through the conductor by pressure upon the same, consisting of a contact-point connected through the conductor and moving therewith, and a second contact connected with the other terminal of the conductor through a suitable source of electric currents and against which the first contact may be placed.

3. The combination, with the incandescing wire and the pins, with the base supporting the same, of the bed of asbestos beneath the wire, the yielding support for the pins, and a circuit-closer operated by pressure upon the wire and the pins, substantially as described.

4. An electric cigar-lighter consisting of a section of wire adapted to be heated by the passage of electric currents, a circuit-closer operated by the pressure of the cigar against the wire, and a support for the wire and the circuit-closer, substantially as described.

5. An electric cigar-lighter consisting of a handle or support, an incandescing conductor, a non-conducting support, pins extending from said support and carrying said conductor, and a bed of refractory material surrounding the pins and upon which the conductor rests, substantially as described.

6. An electric cigar-lighter consisting of the holder A, the incandescing wire $f$, the supporting pins $e$, carrying the wire, the bed $b$, upon which the wire rests, and the conductors $l'$ $l^2$, for supplying currents to the incandescing wire.

7. The combination, with the incandescing wire of an electric cigar-lighter, of supporting-pins therefor projecting beyond the plane of the wire and designed to enter the end of the cigar, substantially as described.

In testimony whereof I have hereunto subscribed my name this 10th day of October, A. D. 1887.

REGINALD BELFIELD.

Witnesses:
DANL. W. EDGECOMB,
CHARLES A. TERRY.